United States Patent
Jang et al.

(10) Patent No.: US 8,723,755 B2
(45) Date of Patent: May 13, 2014

(54) TERMINAL HAVING DUAL DISPLAY UNITS AND METHOD FOR INPUTTING LETTERS THEREIN

(75) Inventors: Ji Won Jang, Seoul (KR); Jae Hyun Ahn, Gumi-si (KR); Yoo Jin Lee, Gumi-si (KR); Ha Na Park, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 894 days.

(21) Appl. No.: 12/132,196

(22) Filed: Jun. 3, 2008

(65) Prior Publication Data
US 2009/0040134 A1 Feb. 12, 2009

(30) Foreign Application Priority Data

Aug. 7, 2007 (KR) .......................... 10-2007-0079015

(51) Int. Cl.
*G09G 5/00* (2006.01)
(52) U.S. Cl.
USPC .............. 345/1.2; 345/1.1; 345/1.3; 455/566; 455/90.2
(58) Field of Classification Search
USPC ..................... 345/1.1, 1.2, 1.3; 455/566, 90.2
See application file for complete search history.

(56) References Cited

U.S. PATENT DOCUMENTS

| | | | | |
|---|---|---|---|---|
| 5,758,267 A * | 5/1998 | Pinder et al. | ................. | 455/90.2 |
| 5,896,575 A * | 4/1999 | Higginbotham et al. | ..... | 455/566 |
| 7,123,243 B2 * | 10/2006 | Kawasaki et al. | ............. | 345/173 |
| 7,230,585 B2 * | 6/2007 | Wakefield | ........................ | 345/55 |
| 7,460,108 B2 | 12/2008 | Tamura | | |
| 7,483,720 B2 * | 1/2009 | Yajima | ........................... | 455/566 |
| 7,801,566 B2 * | 9/2010 | Oga | ............................... | 455/566 |
| 8,050,721 B2 * | 11/2011 | Oga | ............................... | 455/566 |
| 2001/0003707 A1 * | 6/2001 | Moriya | ........................... | 455/566 |
| 2002/0180767 A1 * | 12/2002 | Northway et al. | ............. | 345/698 |
| 2007/0188450 A1 * | 8/2007 | Hernandez et al. | ........... | 345/158 |
| 2010/0048194 A1 * | 2/2010 | Park et al. | ..................... | 455/418 |

FOREIGN PATENT DOCUMENTS

KR 1020050056901 6/2005
KR 100652767 11/2006

* cited by examiner

*Primary Examiner* — Gregory J Tryder
(74) *Attorney, Agent, or Firm* — The Farrell Law Firm, P.C.

(57) ABSTRACT

Provided are a terminal having dual display units and a method for inputting letters therein. The terminal has a main display unit on one side, and a sub-display unit and an input unit on other side. When a screen-flip is requested, a second input window is displayed on the sub-display unit while the main display unit is displaying a first input window. When a letter is selected through the input unit, the selected letter is displayed on the second input window. The displayed letter is saved according to a letter-save request. The saved letter is displayed on the first input window. Therefore, the usability of the main display unit is increased.

8 Claims, 7 Drawing Sheets

TERMINAL HAVING DUAL DISPLAY UNITS AND METHOD FOR INPUTTING LETTERS THEREIN

PRIORITY

This application claims priority under 35 U.S.C. §119(a) to a Korean Patent Application entitled "TERMINAL HAVING DUAL DISPLAY UNITS AND METHOD FOR INPUTTING LETTERS THEREIN" filed in the Korean Intellectual Property Office on Aug. 7, 2007 and assigned Serial No. 2007-0079015, the contents of which are incorporated herein by reference.

BACKGROUND OF THE INVENTION

1. Field of the Invention

The present invention relates to a communication system, and more particularly, to a mobile communication terminal having a dual display unit and to a method for inputting letters therein.

2. Description of the Related Art

In recent years, with the development of mobile communication terminal technology, mobile communication terminals having dual display units have been manufactured and sold on the market. As shown in FIG. 1A and FIG. 1B, such conventional terminals having dual display units are configured in such a way that a main display unit 41 is equipped on one side, and a sub-display unit 42 and an input unit 30 are installed on the other side. However, since the input unit 30 is located on the same side as the sub-display unit 42, users have difficulty inputting letters to be displayed on the main display unit 41.

SUMMARY OF THE INVENTION

The present invention has been made in view of the above problems, and provides a terminal having dual display units that can input letters to be displayed on one side of the terminal through an input unit installed to another side of the terminal. The present invention also provides a method for inputting letters in the terminal having dual input units.

In accordance with an exemplary embodiment of the present invention, the present invention provides a method for inputting letters in a terminal whose one side has a main display unit and whose other side has a sub-display unit and an input unit, the method including when screen-flip is requested, displaying a second input window on the sub-display unit while the main display unit is displaying a first input window; when at least one letter is selected through the input unit, displaying the selected at least one letter on the second input window; saving the displayed at least one letter according to a letter-save request; and displaying the saved at least one letter on the first input window.

In accordance with another exemplary embodiment of the present invention, the present invention provides a terminal including a display unit for displaying a first input window; an input unit for selecting at least one letter, the input unit being installed to one side of the terminal other than a side of the terminal to which the display unit is installed; a sub-display unit, installed to the same side of the terminal as the input unit, for displaying a second input window; and a controller for when a screen-flip is requested, displaying the second input window on the sub-display unit while the first input window is being displayed on the main display unit, displaying the at least one letter selected through the input unit on the second input window, saving the displayed at least one letter according to a letter-saving request, and displaying the saved at least one letter on the first input window.

BRIEF DESCRIPTION OF THE DRAWINGS

The features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

The present invention is described based on a terminal having dual display units, however, it will be appreciated that the present invention can be applied to all information communication devices and multimedia devices, to which dual display units can be installed, and applications of the information communication and multimedia devices, such as mobile communication terminals, mobile phones, Personal Digital Assistant (PDA) terminals, smart phones, Digital Multimedia Broadcasting (DMB) phones, media players, audio devices, portable televisions, digital cameras, etc.

In the exemplary embodiment of the present invention, the input unit and a sub-display unit are installed to a same side. The present invention will also describe the main display unit, wherein the main display unit displays a JAVA™ application established by a JAVA™ language, as an example. However, it should be understood that the present invention is not restricted to the JAVA™ application of the exemplary embodiment.

Figure 1A:
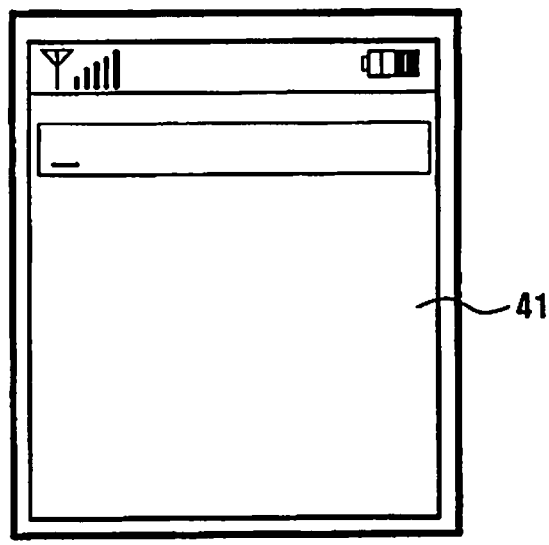
FIG. 1A and FIG. 1B are views illustrating exterior appearances of a conventional terminal.
Figure 1B:
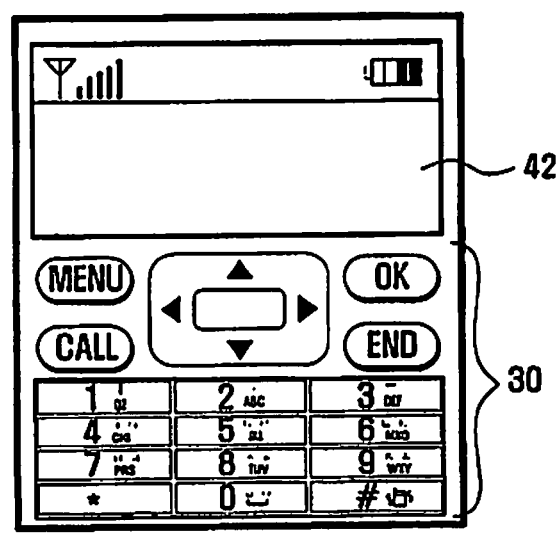
Figure 2:
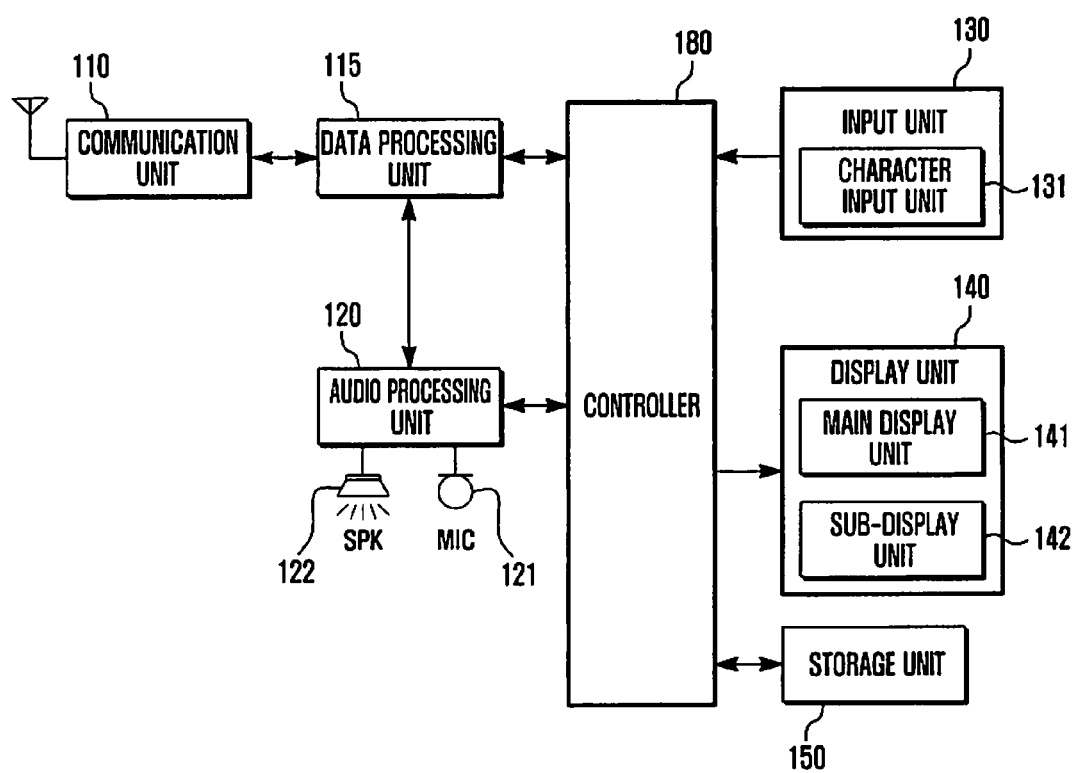
FIG. 2 is a schematic block diagram illustrating a terminal according to an embodiment of the present invention.

FIG. 2 is a schematic block diagram illustrating a terminal according to an embodiment of the present invention. The terminal includes a communication unit 110, a data processing unit 115, an audio processing unit 120, an input unit 130, a display unit 140, a storage unit 150, and a controller 180.

The communication unit 110 is configured to include a Radio Frequency (RF) transmitter for up-converting the frequency of transmitted signals and amplifying the transmitted signal, and an RF receiver for low-noise amplifying received RF signals and down-converting the frequency of the received RF signals.

The data processing unit 115 includes a transmitter for coding and modulating transmitted signals and a receiver for demodulating and decoding received signals, i.e, the data processing unit 115 is configured to include a modem and a codec. The codec includes a data codec for processing packet data etc. and an audio codec for processing audio signals, such as voice signals. Therefore, the data processing unit 115 serves to decode video signals and voice signals transmitted from an opposite party's terminal through the codec.

The audio processing unit 120 reproduces voice signals, output from the audio codec of the data processing unit 115, through a speaker 122, or outputs voice signals, generated through a microphone 121, to the audio codec of the data processing unit 115.

The input unit 130 is implemented by a key-pad, a touch-screen or touch-pad. The input unit 130 outputs a user's input signal to the controller 180 in order to control the operation of the terminal. The input unit 130 inputs a request signal for flipping a screen and a request signal for storing letters input in a second input window and outputs the request signals to the controller 180. It is preferable that the screen-flip request signal and the storage request signals are input to the input unit 130 through touch operations. The input unit 130 includes a letter input unit 131 that is mapped with letters, such as Roman letters, Korean letters, numbers, and special letters, and outputs a user's letter selection signal to the controller 180. The letter input unit 131 is installed to the terminal in the same side as a sub-display unit 142. The letter input unit 131 inputs user's inputting letter information to be displayed on the second window of the sub-display unit 142 and outputs it to the controller 180.

The display unit 140 is implemented by a Liquid Crystal Display (LCD) or an Organic Light Emitting Diode (OLED). The display unit 140 displays various display data generated in the terminal and a current operation state of the terminal on the screen. When the display unit 140 is implemented by a touch screen, the display unit 140 also serves to provide an input function, in addition to the input function provided by the input unit 130.

The display unit 140 is configured to include a main display unit 141 installed to one side of the terminal and a sub-display unit 142 installed to an opposite side, which is the same side as the side to which the input unit 130 is installed. The main display unit 141 is installed to one side of the terminal that does not have a letter input unit 131. The main display unit 141 displays applications, such as a JAVA™ application, executed in the terminal. The sub-display unit 142 is installed to the same side as the letter input unit 131, i.e., the opposite side of the terminal. The sub-display unit 142 displays letters input through the letter input unit 131.

For convenience of description, windows for inputting letters displayed on the main display unit 141 and sub-display unit 142 are called first and second input windows, correspondingly and respectively.

When the main display unit 141 displays the first input window, it also shows a key for flipping a screen to the sub-display unit 142. When the sub-display unit 142 displays the second input window, it also shows a key for saving letters displayed on the second input window and for displaying saved letters on the first input window.

The storage unit 150 stores programs and data necessary for the whole operation of the terminal according to an embodiment of the present invention. In particular, the storage unit 150 stores a program for executing a JAVA™ application to be displayed on the display unit 140. When a letter storing request signal is input through the letter input unit 141, the storage unit 150 saves letters displayed on the second input window according to the control of the controller 180.

The controller 180 controls the whole operation of the terminal. The controller 180 generates and displays a screen-flipping key on the main display unit 141, upon displaying the first input window on the main display unit 141 during the execution of the JAVA™ application. The controller 180 displays the second input window on the sub-display unit 142 upon selecting the screen-flipping key. When a letter is selected, the controller 180 displays the selected letter on the second input window. When a key for storing a letter is selected, the controller 180 saves the letters displayed on the second input window in the storage unit 150. The controller 180 also displays the saved letters on the first input window.

Figure 3:
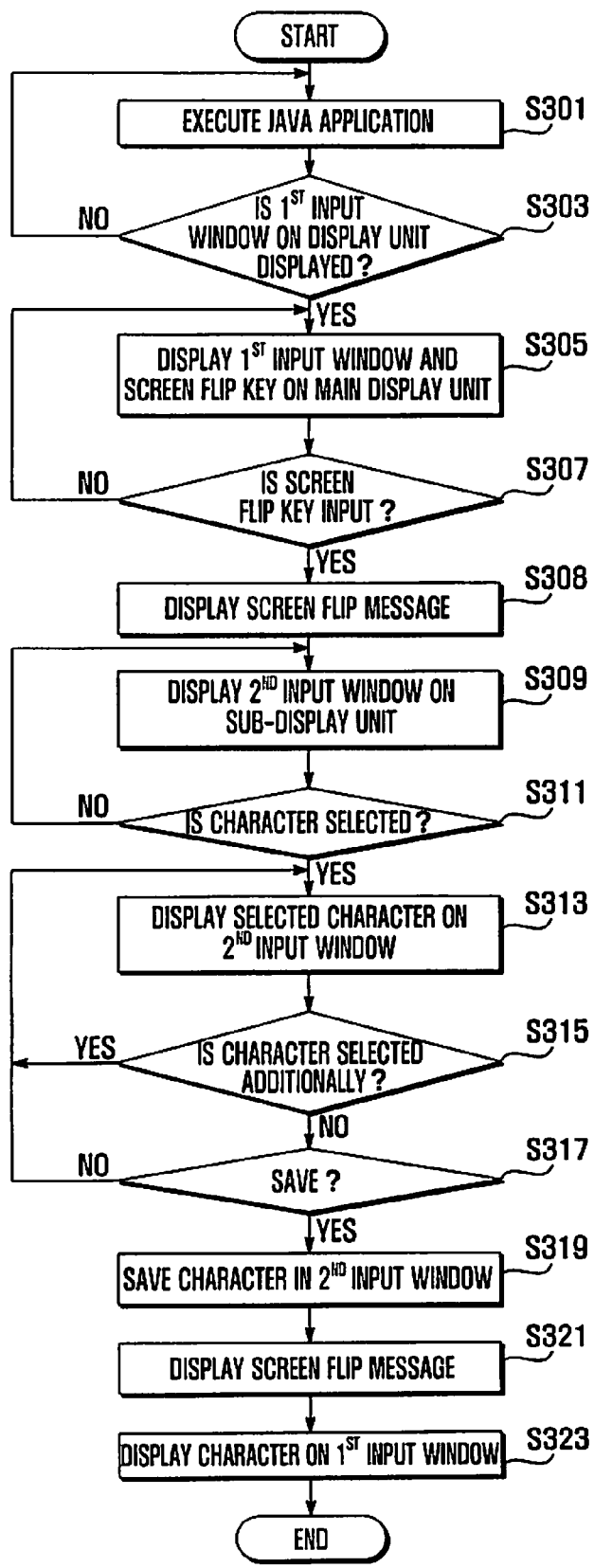
FIG. 3 is a flow chart describing a method for inputting letters in the terminal according to an embodiment of the present invention; and FIG. 4A to FIG. 4G shows screens of the terminal displayed when the method for inputting letters as shown in FIG. 3 is executed.

FIG. 3 is a flow chart describing a method for inputting letters in the terminal according to an embodiment of the present invention. FIGS. 4A to 4G illustrate screens of the terminal shown when the method for inputting letters as shown in FIG. 3 is executed.

The controller 180 executes a JAVA™ application according to a user's request, in step S301. The controller 180 determines whether a request signal, for displaying a first input window on the main display unit 14 during the execution of the JAVA™ application, is input, in step S303. When the request signal is input at step S303, the controller 180 displays the first input window 403 and a screen-flip key 405 on the main display unit 141, in step S305.

When a selection for inputting a letter is requested during the execution of the JAVA™ application, the controller 180 generates and displays the first input window 403, i.e., when a selection for inputting letters, such as a zip code and local area code numbers, is requested during the JAVA™ application, the controller 180 calls a 'TextBox API' or 'TextField API' of the JAVA™ application to generate a first input window 403 and then displays the generated first input window 403 on the main display unit 141. When the first input window 403 is displayed, the controller 180 displays a screen-flip key 405 on the main display unit 141, in which the screen-flip key 405 serves to display the second input window 410 on the sub-display unit 142. The controller 180 can display the screen-flip key 405 in a soft key form on the main display unit 141.

Figure 4A:
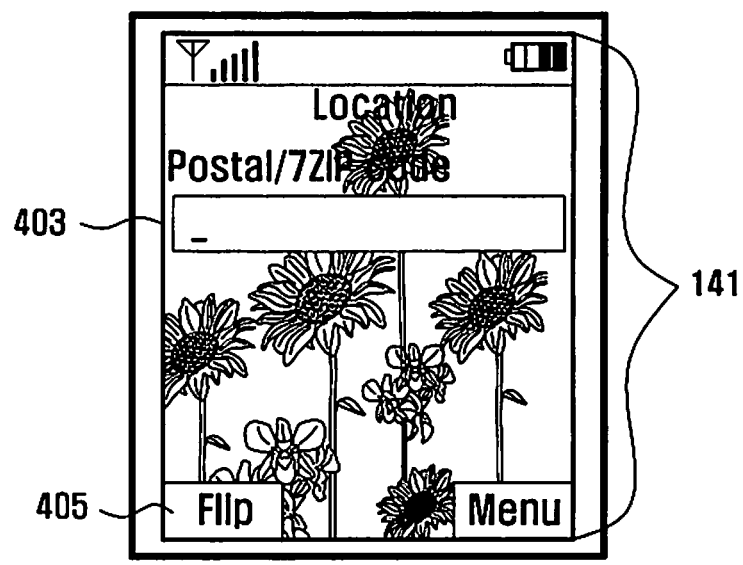
Figure 4B:
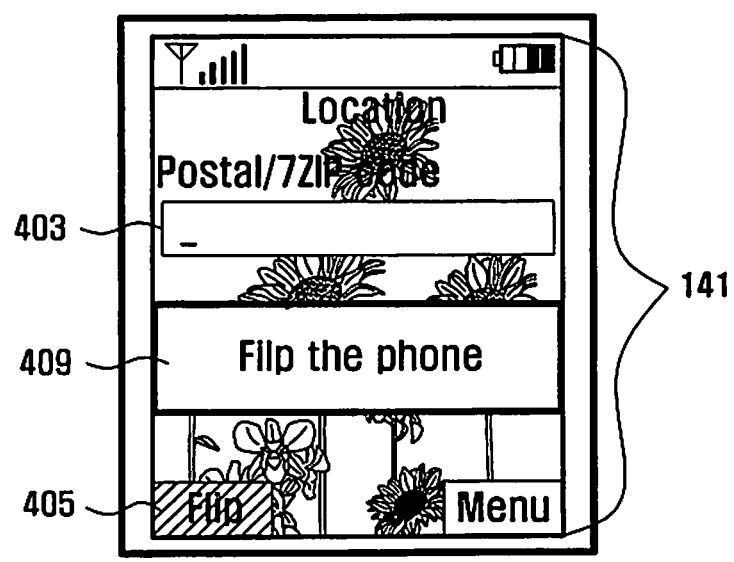
Figure 4C:
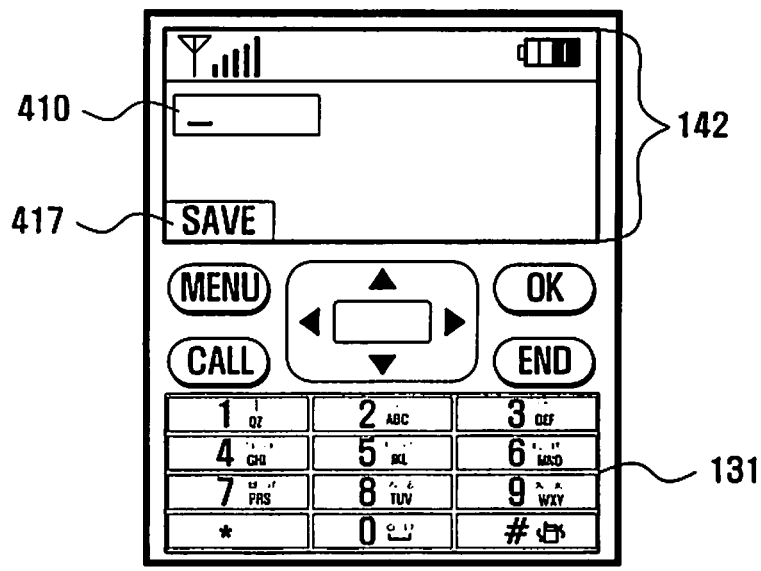

The controller 180 determines whether the screen-flip key 405 is selected, in step S307. The controller 180, as shown on FIG. 4B, displays a message 409 to notify that a screen-flip on the main display unit 141 has occurred, in step S308, upon concluding that the screen-flip key 405 is selected at step S307. The controller 180, as shown in FIG. 4C, displays the second input window 410 on the sub-display unit 142, in step S309. The screen-flip message 409 refers to a message that notifies that the second input window 410 is displayed on the sub-display unit 142. The controller 180 generates and displays a cursor for indicating letters selected by a user on the second input window 410. The controller 180 can also display a save key 417 on the subs-display unit 142, in which the save key 417 serves to save letters to be displayed on the second input window 410.

Figure 4D:
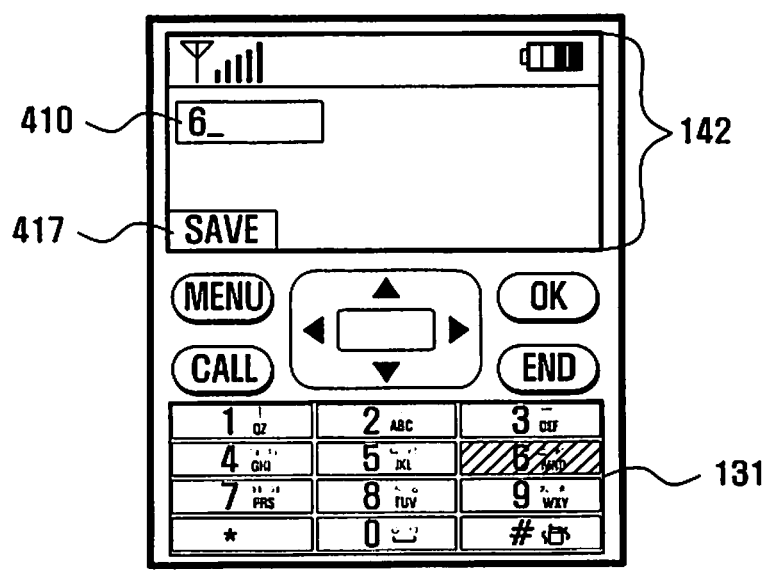
Figure 4E:
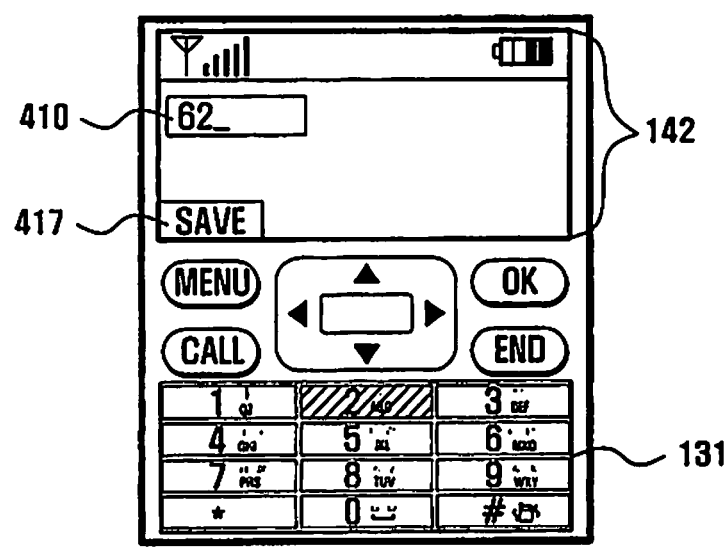

The controller 180 determines whether a letter is selected through the input unit 130, in step S311. When a letter is selected, the controller 180, as shown in FIG. 4D, displays the selected letter on the second input window 410 of the sub-display unit 142, in step S313. After that, the controller 180 further determines whether a letter is additionally selected, in step S315. When a letter is additionally selected at step S315, the controller 180, as shown in FIG. 4E, displays the additionally selected letter after the letter previously displayed on the second input window 410 at step S313.

On the other hand, when a letter is not additionally selected at step S315, the controller 180 further determines whether a save key 417 is selected to save letters displayed on the second input window 410, in step S317. When a save key 417 is selected at S317, the controller 180 saves the letters, displayed on the second window 410, in the storage unit 150, in step S319. On the contrary, when a save key 417 is not selected at step S317, the controller 180 displays letters on the second input window 410 until a selection of the save key 417 is detected, in steps S313 to S317.

Figure 4F:
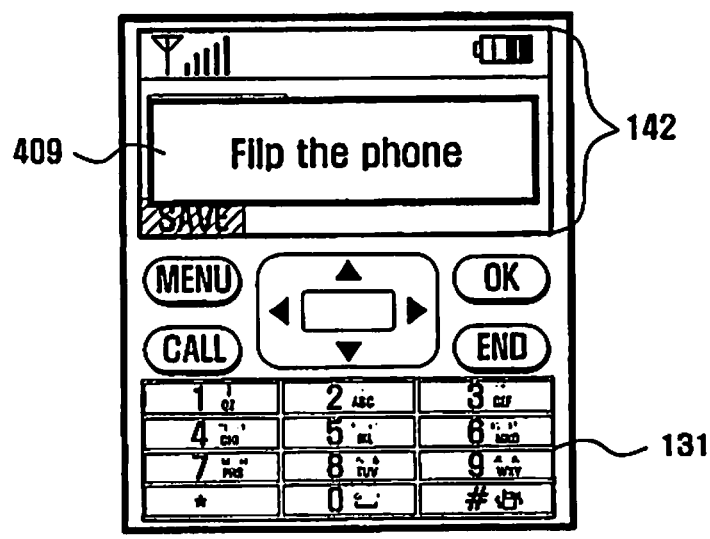
Figure 4G:
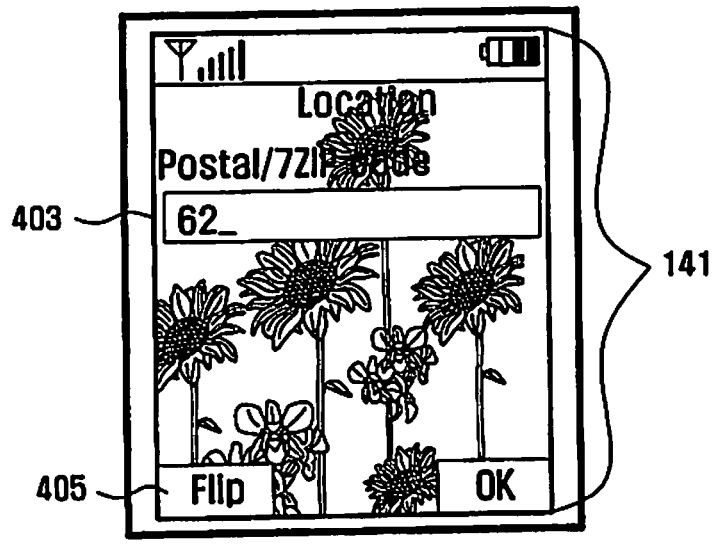

After saving the letters, the controller 180, as shown in FIG. 4F, displays a message to notify that a screen-flip on the sub-display unit 142 has occurred, in step S321. After that, the controller 180, as shown in FIG. 4G, displays the saved letters on the first input window 403, in step S323. The screen-flip message 409 refers to a message that notifies that a letter is displayed on the first input window 403.

For example, when a screen-flip key 405 is selected through the main display unit 141 during the execution of the JAVA™ application, the controller 180 calls an "External-TextBox API" of the JAVA™ application and displays the second input window 410 on the sub-display 142. The controller 180 displays the save key 417 on the sub-display unit 142. When a letter is selected through the input unit 130, the controller 180 displays the selected letter on the second input window 410 and executes the JAVA™ application using the displayed letter.

The screen-flip request signal and save request signal are generated by a soft key in an exemplary embodiment of the present invention, however, it should be understood that the present invention is not limited to the soft key of the exemplary embodiment. For example, the present invention can be implemented in such a way that the screen-flip request signal and save request signal are generated by a hot key or through an RF signal or a voice signal.

As described in the foregoing, the mobile communication terminal and the method for inputting letters in the mobile communication terminal, according to the present invention, can input letters to be displayed on a main display unit installed to one side thereof, through a letter input unit installed to another side thereof, thereby increasing the usability of the main display unit.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for inputting letters in a terminal whose one side has a main display unit and whose other side has a sub-display unit and an input unit, the method comprising:

when a screen-flip is requested in a first input window, displaying a screen flip message on the main display unit and displaying a second input window on the sub-display unit while the main display unit is displaying the first input window;

when at least one letter is selected through the input unit, displaying the selected at least one letter on the second input window;

saving the displayed at least one letter and displaying the screen flip message on the sub-display unit according to a letter-save request; and displaying the saved at least one letter on the first input window.

2. The method of claim 1, further comprising when the first input window is displayed, displaying a screen-flip key on the main display unit, in which the screen-flip key displays the second input window on the sub-display unit, wherein when the screen-flip key is selected, the second input window is displayed.

3. The method of claim 2, further comprising displaying, on the main display unit, a message that notifies that the second input window is displayed on the sub-display unit.

4. The method of claim 2, further comprising:

displaying a message on the sub-display unit that notifies that the saved at least one letter is displayed on the main display unit.

5. A terminal comprising:

a main display unit for displaying a first input window;

an input unit for selecting at least one letter, the input unit being installed to one side of the terminal other than a side of the terminal to which the display unit is installed;

a sub-display unit, installed to the same side of the terminal to which the input unit is installed, for displaying a second input window; and a controller for, when a screen-flip is requested in the first input window, displaying a screen flip message on the main display unit, displaying the second input window on the sub-display unit while the first input window is being displayed on the main display unit, displaying the at least one letter selected through the input unit on the second input window, saving the displayed at least one letter according to a letter-saving request, displaying the screen flip message on the sub-display unit and displaying the saved at least one letter on the first input window.

6. The terminal of claim 5, wherein, when the first input window is displayed on the main display unit, the controller displays a screen-flip key on the main display unit.

7. The terminal of claim 6, wherein, when the screen-flip is requested, the controller displays, on the main display unit, a message that notifies that the second input window is displayed on the sub-display unit.

8. The terminal of claim 6, wherein, upon receiving the letter-saving request, the controller displays a message on the sub-display unit that notifies that the saved at least one letter is displayed on the main display unit.

* * * * *